L. A. GORDON.
DEMOUNTABLE RIM.
APPLICATION FILED JUNE 12, 1913.
1,080,337.
Patented Dec. 2, 1913.
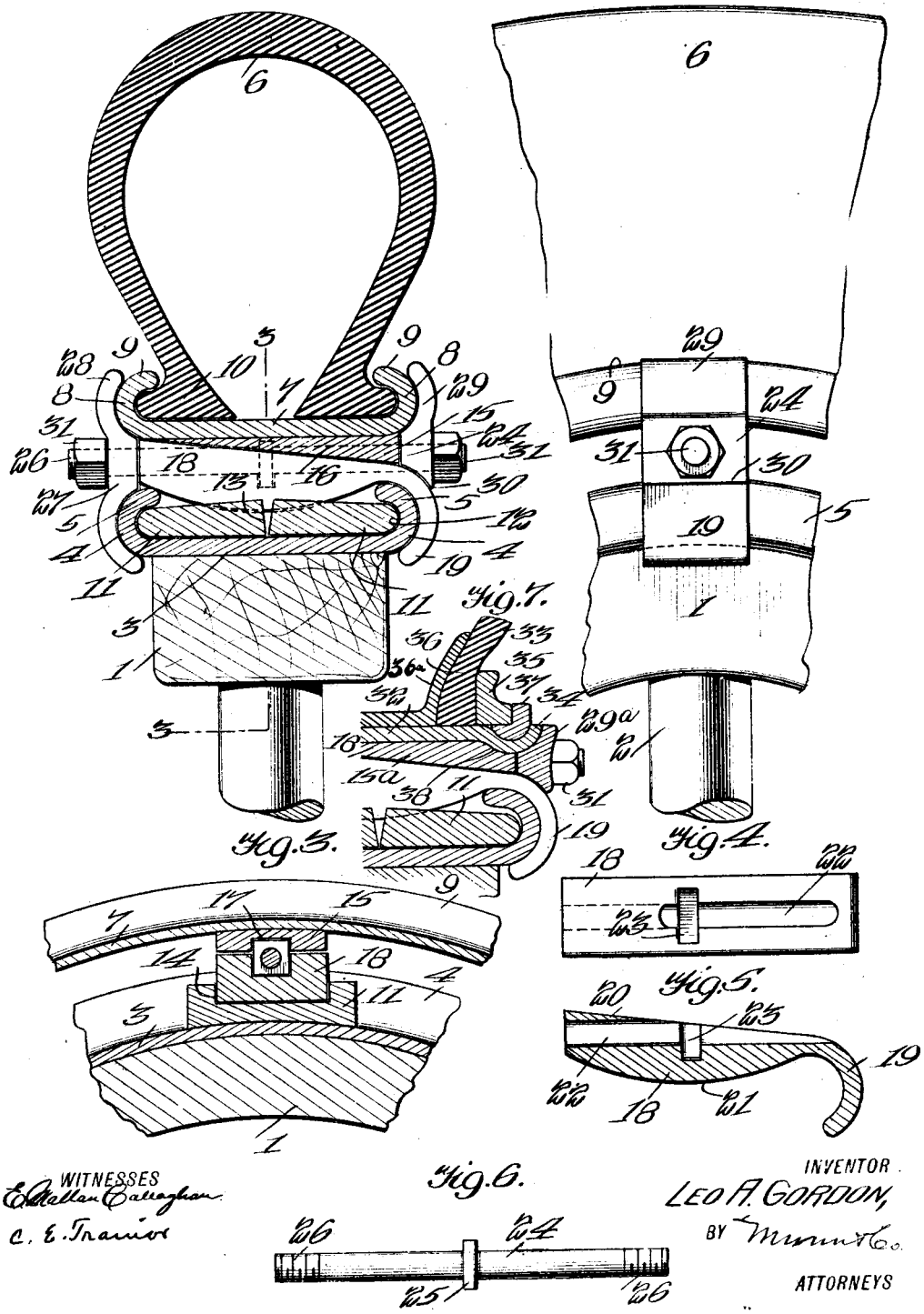

ference
UNITED STATES PATENT OFFICE.

LEO A. GORDON, OF FALL RIVER, MASSACHUSETTS.

DEMOUNTABLE RIM.

1,080,337. Specification of Letters Patent. Patented Dec. 2, 1913.

Application filed June 12, 1913. Serial No. 773,313.

*To all whom it may concern:*

Be it known that I, LEO A. GORDON, a citizen of the United States, and a resident of Fall River, in the county of Bristol and State of Massachusetts, have invented a new and useful Improvement in Demountable Rims, of which the following is a specification.

My invention is an improvement in demountable rims, and has for its object to provide a rim of the character specified, especially adapted for use in vehicle wheels having pneumatic tires for permitting the rim which directly supports the pneumatic tire to be demounted from the wheel, in order to facilitate the removal of the tire from its engagement with the rim, and the invention has for its more especial object an arrangement whereby the improved rim may be mounted on wheels having ordinary rims of the clencher or quickly separable type, without requiring changes in the rim itself.

In the drawings: Figure 1 is a transverse section of a part of a wheel provided with the improved rim, Fig. 2 is a side view of Fig. 1, Fig. 3 is a section on the line 3—3 of Fig. 1, Fig. 4 is a top plan view of one of the clamping elements, Fig. 5 is a section on the line 5—5 of Fig. 4, Fig. 6 is a top plan view of the clamping bolt, and Fig. 7 is a view similar to Fig. 1 showing the invention in connection with a rim of the quickly separable type.

The present embodiment of the invention is shown in connection with a wheel having a felly 1 of wood, connected to the hub not shown, by spokes 2. An ordinary clencher type rim 3 is mounted on the felly, the said rim having at each side edge a lateral flange 4, whose extremity overlies the body of the rim as shown at 5.

The casing 6 of the pneumatic tire is shown in connection with a rim 7 of the clencher type, the said rim having at each edge a lateral flange 8, provided at its extremity with a portion 9 overlying the body of the rim, and the said rim 7 is of greater diameter than the rim 3, so that it may be arranged on the wheel coaxial with the said rim 3 in radially spaced relation. The rim 7 is in all respects similar to the rim 3 with this exception.

The casing 6 of the pneumatic tire is provided with the usual ribs 10, at its side edges and on the outer surface of the casing, the said ribs being adapted to fit beneath the overlying portions 9 of the flanges 8 of the outer rim 7. When the said casing is inflated, the pressure within the casing will force the side edges outwardly into close and tight contact with the portions 8 and 9 of the flanges to prevent disengagement between the side edges of the casing and the said outer rim.

At spaced intervals filling devices are arranged between the rims 3 and 7, each of the said filling devices having in addition to its function as a filling device the other and equally important function of a clamping device. The spacing of the clamping device will depend upon the conditions the wheel is intended to meet in service, the said device being arranged at closer intervals for wheels intended for heavy work than with wheels intended for light work. In the wheel intended for use under ordinary conditions, five of the said devices will be used, and they should be spaced at angular intervals of 72°. Each of the said devices comprises a pair of blocks 11, the said blocks having an aggregate length equal to the width of the rim 3, and the outer end of each block is rounded as shown at 12, to fit within the flange 4 of the rim. The blocks are approximately wedge shape, being of greater width at their inner adjacent ends than at their outer ends, and each block has its inner end beveled from above downwardly as indicated at 13 in Fig. 1. Each block is also grooved on its upper face at its inner end as indicated at 14, and a two-part filler or spreader is arranged above each pair of blocks. Each of the said spreaders consists of a wedge 15, having its upper face bearing against the inner or under face of the rim 7, and the said wedge is of such length that it will extend from side to side of the rim. The said wedge is also grooved on its under face longitudinally, as indicated at 16, in dotted lines in Fig. 1, and at the center of the said groove, the wedge is provided with a recess 17, the said recess or groove extending transversely of the groove 16. The other member of the spreader comprises a shank 18, and a hook 19, the said shank and the hook being integral and the upper face of the shank is beveled from side to side, as shown at 20, the said beveled or inclined face fitting against the under face of the wedge 15.

The under face of the shank is convex longitudinally as shown at 21, and the said convexity is received in the grooves 14 of the blocks 11. The shank is provided with a longitudinally extending opening 22, the said opening cutting the upper face of the shank near the end remote from the hook and being from this point to the end adjacent to the hook a groove instead of an opening. The grooved portion of the opening 22 is provided with a transverse notch, groove or recess 23 at approximately the center of the shank, the said notch or recess 23, being adapted to register with the groove or notch 17 of the wedge 15. The longitudinal groove 16 of the wedge 15 is also adapted to register with the grooved portion of the opening 22 of the shank 18, and when the wedge and the shank are in proper position, the opening 22 is complete as an opening and the bolt shown in Fig. 6 is received in the said opening and notches. The said bolt 24 is provided at its center with a rib or head 25, the said rib or head being square in cross section and each end of the bolt is threaded as shown at 26. A cross head 27 is arranged at one end of the bolt, the said cross head having a central opening through which the end of the bolt extends, and each end of the cross head is arched or curved to fit the adjacent curved edge of the rims 3 and 7 as indicated at 28.

The hook 19 of the shank 18 engages the opposite side of the rim 3, and a hook 29 is provided for engaging the opposite side edge of the rim 7. The said hook is provided with a shank 30, having a central opening through which the opposite end of the bolt 24 extends, and each end of the bolt is engaged by a nut 31, to hold the parts in their proper position.

The large end or base of the wedge 15 is plane and the inner face of the shank 30 of the hook 29 fits against the same, the ends of said shank remote from the hook 29 being shaped to fit the curve of the hook 19 of the shank 18. The convexity 21 of the shank 18 spaces the ends of the shank above the blocks, so that they may pass above the free edges of the flanges of the rim. When the nuts 31 are tightened on the threaded ends of the bolts, the parts are tightly held in position between the two rims.

In assembling the parts, the blocks 11 are first placed on the inner rim, after which the wedge and the shank with the bolt in place are inserted between the upper faces of the blocks, and the inner face of the outer rim, and with the convexity 21 of the shank in the grooves of the blocks. The cross head is then placed on the adjacent end of the bolt, and the nut 31 adjacent thereto is turned in place to hold the cross head in proper position. The hook 29 is then placed on the opposite end of the bolt and the nut 31 adjacent thereto is turned into place. To demount the rim 7, the nut 31 adjacent to the hook 29 is first removed to permit the removal of the hook. The demountable rim carrying the pneumatic tire may now be removed from the wheel, by slipping it laterally away from the cross head.

In providing a wheel having a clencher rim with a demountable rim, it is essential that the clencher rim be removed and replaced by a plain band. With the present construction the shoe or casing 6 of the tire is merely mounted on a clencher rim of greater diameter than the rim of the wheel. As many of the clamping devices may be inserted as may be necessary or advisable and no changes whatever are required in either rim, all of the clamping and filling mechanisms being in the blocks, wedge and shank.

In Fig. 7 the improvement is shown in connection with a quickly separable rim 32. The said rim is provided at one edge with a flange, not shown, and the ribbed edge 36 of the shoe 33 is held in position by a clamping ring 35, arranged between the said rib and the flange. The inner tube 36ª prevents escape of air between the rim 32 and the shoe 36. At its opposite side edge the rim 32 is provided with a marginal annular groove 34. A second clamping ring 35 is arranged on the outer side of the rib 36 of the shoe, and a locking ring 37 is arranged in the groove for locking the ring 35 in position. The filling and clamping mechanism is essentially the same as that shown in Figs. 1 to 6, the only changes being in the wedge and the hook. The said wedge 15ª is provided at the end remote from the cross head with a recess or notch 38 for receiving the rib formed by the groove 34, and the hook 29ª is shortened for the reason that the rim 32 is not provided with a flange for engagement by the hook. The only changes in the hook are in shape and not in function, the function of all of the parts being precisely the same as in the construction shown in Figs. 1 to 6.

The function of each and every element of the filling and clamping device is precisely the same as in the first-described construction. The wedge and the hook are of slightly different shape, because of the fact that they engage differently-shaped members.

In practice, the wedge 15 or 15ª is welded to the demountable rim 7 or 32, remaining thus a part of the same. To demount the rim shown in Fig. 7, the nut 31 and the hook 29ª are the only parts necessary to be removed, and the remaining elements may remain in place.

I claim:—

1. The combination with a vehicle wheel having a rim, of a demountable support for a pneumatic tire, said support comprising a rim of greater diameter than the first-named rim on which the pneumatic tire is supported, and a plurality of filling and clamping devices arranged between the rims at regular intervals for preventing lateral movement of the larger rim with respect to the smaller rim for connecting the said rims, and for holding the said rims in spaced relation, each of the said devices comprising a pair of blocks arranged transversely of the smaller rim and bearing at their ends against the flanges thereof, said blocks being of greater thickness at their inner ends than at their outer ends and gradually decreasing in thickness toward the said outer ends, each block having a groove on its upper face at its inner end, the said grooves being in alinement, a shank having its lower surface convex from end to end and fitting the registering grooves of the blocks, said shank having at one end a hook for engaging outside the side edge of the inner rim, the upper face of the said shank inclining downwardly toward the hook, a wedge secured to the outer rim resting on the inclined face of the shank, and having that face remote from the shank bearing against the inner face of the outer rim, said shank and wedge having registering grooves on their meeting faces, said grooves coöperating to form an opening, that portion of the opening remote from the hook of the shank being within the shank, said wedge and shank each having at the center of the groove a transverse recess intersecting the groove, a bolt within the passage formed by the grooves and having each of its ends threaded and having at approximately its center a head for engaging the notches, a cross head at the end of the bolt remote from the hook of the shank, said cross head having a central opening for the bolt, and having each of its ends curved to engage outside of the adjacent edges of the rims, a hook engaging the opposite edge of the outer rim and having an opening for receiving the adjacent end of the bolt, and nuts threaded on to the opposite ends of the bolt.

2. The combination with a vehicle wheel having a rim, of a demountable support for a pneumatic tire, said support comprising a rim of greater diameter than the first-named rim on which the pneumatic tire is supported, and a plurality of filling and clamping devices arranged between the rims at regular intervals for preventing lateral movement of the rims with respect to each other and for connecting and holding the said rims in spaced relation, each of the said devices comprising a pair of blocks arranged transversely of the inner rim and bearing at their ends against the flanges hereof, said blocks being of greater thickness at their meeting ends and gradually decreasing in thickness toward their outer ends, each block having a groove on its upper face at the inner end thereof, said grooves being in alinement, a shank having at one end a hook and having its upper face beveled toward the hook, a wedge fitting the upper face of the shank, said shank and wedge being received between the blocks and the outer rim with the under face of the shank in the grooves of the blocks, said wedge and shank having registering longitudinally extending grooves, each groove having at the center thereof a transverse notch, a bolt having a head received in the notch and having its opposite ends threaded, a cross head at the end of the bolt remote from the hook of the shank for engaging the edges of both rims, a hook at the opposite end of the bolt for engaging the outer rim, the hook of the shank engaging the inner rim, and nuts threaded on to the bolt.

3. The combination with a vehicle wheel having a rim, of a demountable support for a pneumatic tire, said support comprising a rim of greater diameter than the first-named rim on which the pneumatic tire is supported, and a plurality of filling and clamping devices arranged between the rims at regular intervals for preventing lateral movement of the rims with respect to each other and for connecting and holding the said rims in spaced relation, each of the said devices comprising a pair of blocks arranged transversely of the inner rim, a shank having at one end a hook for engaging the inner rim, and having its upper face beveled toward the hook, a wedge fitting the said upper face, said wedge and shank having longitudinally extending grooves registering to form an opening, a bolt in the opening, said bolt having its opposite ends threaded, means in connection with the bolt, the shank and the wedge for anchoring the said bolt intermediate of its ends to the shank and the wedge, a cross head at the end of the bolt remote from the hook of the shank, a hook at the opposite end for engaging the outer rim, and nuts on the ends of the bolt 4. The combination with a vehicle wheel having a rim, of a demountable support for a pneumatic tire, said support comprising a rim of greater diameter than the first-named rim on which the pneumatic tire is supported, and a plurality of filling and clamping devices arranged between the rims at regular intervals for preventing lateral movement of the rims with respect to each other and for connecting and holding the said rims in spaced relation, each of the said devices comprising a pair of blocks arranged in alinement transversely of the rim, a shank having at one end a hook for engaging the inner rim and having its upper face beveled toward the hook, a wedge seated on the shank, a cross head engaging both rims at the end of the shank remote from the hook, a hook engaging the outer rim at the opposite end of the shank, and means for drawing the said cross head and hook toward each other.

5. The combination with a vehicle wheel having a rim, of a demountable rim for a pneumatic tire of greater diameter than the first-named rim for supporting the pneumatic tire and a plurality of filling and clamping devices arranged between the rims at regular intervals for connecting and holding the rims in spaced relation and for preventing lateral movement of the rims with respect to each other, said means comprising wedges secured to the larger rim, filling blocks on the smaller rim, a shank having an inclined surface coöperating with the wedge arranged between the wedge and the blocks, means at each side of the rims for engaging outside of the same, and means for drawing the said engaging means toward each other.

6. The combination with a vehicle wheel, of a demountable rim for a pneumatic tire arranged coaxial with the wheel, and a plurality of filling and clamping devices arranged between the rim and the wheel for connecting and holding the rim to the wheel and for preventing lateral movement of the rim with respect to the wheel, each of the said means comprising a wedge and a block, and a shank arranged between the wedge and the block and having an inclined surface coöperating with the wedge, means at each side of the rim for engaging the said rim, and means for drawing the said engaging means toward each other.

LEO A. GORDON.

Witnesses:
ELIZABETH E. GORDON,
ALICE PURDY.